US010746235B2

(12) United States Patent
Denninger et al.

(10) Patent No.: US 10,746,235 B2
(45) Date of Patent: Aug. 18, 2020

(54) MULTIMODE CONTROL SYSTEM FOR MAGNETORHEOLOGICAL FLUID ACTUATOR UNIT

(71) Applicant: EXONETIK INC., Sherbrooke (CA)

(72) Inventors: Marc Denninger, Sherbrooke (CA); Guifre Julio, Sherbrooke (CA); Jean-Sebastien Plante, Sherbrooke (CA); Pascal Larose, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 123 days.

(21) Appl. No.: 16/095,528

(22) PCT Filed: Apr. 25, 2017

(86) PCT No.: PCT/CA2017/050506
§ 371 (c)(1),
(2) Date: Oct. 22, 2018

(87) PCT Pub. No.: WO2017/185176
PCT Pub. Date: Nov. 2, 2017

(65) Prior Publication Data
US 2019/0128340 A1 May 2, 2019

Related U.S. Application Data

(60) Provisional application No. 62/327,102, filed on Apr. 25, 2016.

(51) Int. Cl.
*F16D 37/00* (2006.01)
*B25J 9/10* (2006.01)
(Continued)

(52) U.S. Cl.
CPC ............ *F16D 37/008* (2013.01); *B25J 9/104* (2013.01); *B25J 9/126* (2013.01); *B25J 9/146* (2013.01);
(Continued)

(58) Field of Classification Search
CPC ........ B25J 9/1646; B25J 13/088; B25J 19/00; B25J 19/068; B25J 9/146; B25J 19/063; B25J 9/104; B25J 9/126; B25J 13/085
See application file for complete search history.

(56) References Cited

U.S. PATENT DOCUMENTS 2,661,825 A  12/1953  Winslow
2013/0047772 A1*  2/2013  Shafer ................. B25J 19/06
74/490.03
(Continued)

FOREIGN PATENT DOCUMENTS

CA        2937498 A1   8/2015
CN      105221602 A    1/2016
WO     2016134472 A1   9/2016

*Primary Examiner* — David J Hlavka
(74) *Attorney, Agent, or Firm* — Norton Rose Fulbright Cananda LLP (57) ABSTRACT

A control system is provided for controlling movements of an end effector connected to a clutch output of at least one magnetorheological (MR) fluid clutch apparatus. A clutch driver is configured to drive the at least one MR fluid clutch apparatus between a controlled slippage mode, in which slippage between a clutch input and the clutch output of the MR fluid clutch apparatus varies, and a lock mode, in which said slippage between the clutch input and the clutch output is maintained below a given threshold, the clutch output transmitting movement to the end effector. A motor driver is configured to control a motor output of at least one motor, the motor output coupled to the clutch input. A mode selector module is configured to receive signals representative of at least one movement parameter of the end effector, the mode selector module selecting a mode between the controlled slippage mode and the lock mode of the clutch driver based on the signals, and switching the selected mode based on the signals. A movement controller controls the clutch driver and the motor driver to displace the end
(Continued)

effector based on at least one of the selected mode and on commanded movements of the end effector for the end effector to achieve the commanded movements. A method for controlling movements of an end effector connected to the MR fluid clutch apparatus is also provided.

20 Claims, 9 Drawing Sheets

(51) Int. Cl.
| | |
|---|---|
| B25J 9/12 | (2006.01) |
| B25J 13/08 | (2006.01) |
| F16D 27/10 | (2006.01) |
| F16D 48/06 | (2006.01) |
| F16D 37/02 | (2006.01) |
| B25J 9/16 | (2006.01) |
| F16D 7/02 | (2006.01) |
| B25J 19/00 | (2006.01) |
| B25J 19/06 | (2006.01) |
| B25J 9/14 | (2006.01) |

(52) U.S. Cl.
CPC .......... *B25J 9/1646* (2013.01); *B25J 13/085* (2013.01); *B25J 13/088* (2013.01); *B25J 19/00* (2013.01); *B25J 19/063* (2013.01); *B25J 19/068* (2013.01); *F16D 7/02* (2013.01); *F16D 27/10* (2013.01); *F16D 37/02* (2013.01); *F16D 48/06* (2013.01); *F16D 2037/001* (2013.01); *F16D 2037/007* (2013.01)

(56) References Cited

U.S. PATENT DOCUMENTS

| | | | |
|---|---|---|---|
| 2013/0175132 A1* | 7/2013 | Battlogg | F16F 9/535 192/21.5 |
| 2015/0083868 A1 | 3/2015 | Covington, Jr. et al. | |
| 2015/0217865 A1 | 8/2015 | Spina et al. | |
| 2016/0153508 A1* | 6/2016 | Battlogg | F16D 37/02 74/553 |

* cited by examiner

MULTIMODE CONTROL SYSTEM FOR MAGNETORHEOLOGICAL FLUID ACTUATOR UNIT

CROSS-REFERENCE TO RELATED APPLICATION

The present application claims priority on U.S. Patent Application No. 62/327,102, filed on Apr. 25, 2016 and incorporated herein by reference.

FIELD OF THE APPLICATION

The present application relates generally to magnetorheological (MR) fluid clutch apparatuses, and more particularly, to antagonist systems using such apparatuses.

BACKGROUND OF THE ART

State-of-the-art distributed power devices rely on hydraulics or electromagnetic actuation. Hydraulic actuation is reliable towards mechanical jam, but has fundamentally limited dynamic response and efficiency. Furthermore, implementation of hydraulic systems into commercial applications may be problematic as hydraulics are prone to leakage, leading to increased maintenance costs. Moreover, hydraulic actuation is hardware intensive.

Electromagnetic actuation offers a clean alternative to hydraulic actuation. For high dynamic applications, the most common form of electromechanical actuation is found in direct-drive motors, which are prohibitively heavy. Device weight can be considerably reduced by providing a reduction ratio between the motor and the end-effector. Indeed, when coupled to reduction gearboxes, electromechanical actuators are lighter and less expensive than direct drive solutions, but their high output inertia, friction and backlash may diminish their dynamic performance.

MR fluid clutch apparatuses are known as useful apparatuses for transmitting motion from a drive shaft with precision and accuracy, among other advantages, which could enhance the performance of electromechanical actuation systems.

MR fluid is known to permanently change properties over time. These changes may include, non-exhaustively, a change in viscosity, a change in the ability to transmit a shear stress in function of the magnetic flux density in the MR fluid, and a change of magnetic permeability. One factor contributing to the change of properties is the energy dissipated in the fluid when the fluid is solicited in a shear situation. A shear situation of the fluid occurs when torque is transmitted by the MR fluid clutch apparatus while an angular speed difference is present between the input and the output of the MR fluid clutch apparatus. In this condition, the apparent yield shear stress of the MR fluid in the interface between the input and the output of the MR fluid clutch apparatus controls the torque transmitted from the input of the MR fluid clutch apparatus to its output. In such a shear situation, the MR fluid absorbs energy that may be proportional to the speed difference and the torque transmitted from the input to the output. The higher the transmitted torque of the MR fluid clutch apparatus and the higher the angular speed between the input rotor and the output rotor, the more energy may be dissipated in the MR fluid and the greater the properties of the MR fluid may change over time.

SUMMARY OF THE APPLICATION

It is therefore an aim of the present disclosure to provide a novel antagonistic system using a MR fluid for torque transmission.

It is a further an aim of the present disclosure to provide a control system for a magnetorheological fluid apparatus or apparatuses that addresses issues related to the prior art.

It is a still further aim of the present disclosure to provide method for controlling movements of an end effector connected to one or more magnetorheological (MR) fluid clutch apparatuses, addressing issues related to the prior art.

Therefore, in accordance with a first embodiment of the present application, there is provided a control system for controlling movements of an end effector connected to a clutch output of at least one magnetorheological (MR) fluid clutch apparatus, the control system comprising: a clutch driver configured to drive the at least one MR fluid clutch apparatus between a controlled slippage mode, in which slippage between a clutch input and the clutch output of the MR fluid clutch apparatus varies, and a lock mode, in which said slippage between the clutch input and the clutch output is maintained below a given threshold, the clutch output transmitting movement to the end effector; a motor driver configured to control a motor output of at least one motor, the motor output coupled to the clutch input; a mode selector module configured to receive signals representative of at least one movement parameter of the end effector, the mode selector module selecting a mode between the controlled slippage mode and the lock mode of the clutch driver based on the signals, and switching the selected mode based on the signals; and a movement controller to control the clutch driver and the motor driver to displace the end effector based on at least one of the selected mode and on commanded movements of the end effector for the end effector to achieve the commanded movements.

Further in accordance with the first embodiment, the mode selector module in an instance receives data on the commanded movements and selects the mode according to the commanded movements and on the at least one movement parameter.

Still further in accordance with the first embodiment, the clutch driver supplies current in an instance to the at least one MR fluid clutch apparatus to reduce the slippage.

Still further in accordance with the first embodiment, the clutch driver supplies current in an instance to the at least one MR fluid clutch apparatus to increase the slippage.

Still further in accordance with the first embodiment, the motor driver is in an instance configured to a vary an intensity of a motor output of the at least one motor, and wherein the movement controller determining the intensity of the motor output in the locked mode.

Still further in accordance with the first embodiment, the mode selector module receives in an instance signals indicative of a manual contact with the end effector, and selects the controlled slippage mode throughout the manual contact.

Still further in accordance with the first embodiment, the mode selector module receives in an instance signals indicative of a position of the end effector in a working envelope thereof, and selects the mode based on the position.

Still further in accordance with the first embodiment, the mode selector module determines in an instance that the position of the end effector is in a high controllability portion of the working envelope and selects the controlled slippage mode for the high controllability portion.

Still further in accordance with the first embodiment, the mode selector module determines in an instance that the position of the end effector is in a low controllability portion of the working envelope and selects the lock mode for the low controllability portion.

Still further in accordance with the first embodiment, the mode selector module receives in an instance signals indicative of at least one of a speed and acceleration of the end effector, the mode selector module selecting the controlled slippage mode when the speed and/or acceleration is beyond a programmed threshold.

Still further in accordance with the first embodiment, the mode selector module determines in an instance from the commanded movements a change of direction of the end effector, the mode selector module selecting the controlled slippage mode for the change of direction of the end effector.

Still further in accordance with the first embodiment, the mode selector module in an instance selects and maintains the lock mode for 75%-98% of an operation of the end effector.

In accordance with a second embodiment of the present disclosure, there is provided an assembly of a control system and MR fluid actuator unit controlling movements of an end effector, the assembly comprising: the control system as described above, at least one MR fluid actuator unit including at least one MR fluid clutch apparatus and at least one motor, each of the at least one MR fluid clutch apparatus having a clutch output transmitting movement to the end effector, and having a clutch input coupled to an output of at least one motor.

Further in accordance with the second embodiment, the at least one MR fluid actuator unit has in an instance two of the MR fluid clutch apparatus for a single one of the motor.

In accordance with a third embodiment of the present disclosure, there is provided a method for controlling movements of an end effector connected to at least one magnetorheological (MR) fluid clutch apparatus, the method comprising: continuously sensing at least one movement parameter of the end effector; selecting a mode of operation of the MR fluid clutch apparatus based on at least one movement parameter and a commanded movement; driving a motor output of at least one motor coupled to the MR fluid clutch apparatus, while keeping a slippage of the MR fluid clutch apparatus below a given threshold to cause a displacement of the end effector in a commanded movement in a lock mode; and varying the slippage of the MR fluid clutch apparatus beyond the given threshold to continue a displacement of the end effector in the commanded movement in a controlled slippage mode.

Further in accordance with the third embodiment, driving the motor output in the lock mode comprises in an instance maintaining an intensity of the motor output fixed.

Still further in accordance with the third embodiment, varying the slippage of the MR fluid clutch apparatus includes in an instance supplying current to the at least one MR fluid clutch apparatus to reduce the slippage.

Still further in accordance with the third embodiment, varying the slippage of the MR fluid clutch apparatus includes in an instance supplying current to the at least one MR fluid clutch apparatus to increase the slippage.

Still further in accordance with the third embodiment, driving the motor output in the lock mode comprises in an instance varying an intensity of the motor output based on at least one movement parameter and a commanded movement.

Still further in accordance with the third embodiment, continuously sensing includes in an instance sensing a manual contact with the end effector, and wherein selecting the mode of operation includes selecting the controlled slippage mode throughout the manual contact.

Still further in accordance with the third embodiment, continuously sensing includes sensing in an instance a position of the end effector in a working envelope thereof, and wherein selecting the mode of operation includes selecting the mode based on the position.

Still further in accordance with the third embodiment, sensing a position of the end effector in the working envelope includes in an instance determining that the position of the end effector is in a high controllability portion of the working envelope, and wherein selecting the mode of operation includes selecting the controlled slippage mode for the high controllability portion.

Still further in accordance with the third embodiment, sensing a position of the end effector in the working envelope includes in an instance determining that the position of the end effector is in a low controllability portion of the working envelope, and wherein selecting the mode of operation includes selecting the lock mode for the low controllability portion.

Still further in accordance with the third embodiment, continuously sensing includes in an instance sensing at least one of a speed and acceleration of the end effector, and wherein selecting the mode of operation includes selecting the controlled slippage mode when the speed and/or acceleration is beyond a programmed threshold.

Still further in accordance with the third embodiment, selecting the mode of operation includes in an instance determining from the commanded movements a change of direction of the end effector, and selecting the controlled slippage mode for the change of direction of the end effector.

Still further in accordance with the third embodiment, selecting the mode of operation includes in an instance selecting and maintaining the lock mode for 75%-98% of an operation of the end effector.

BRIEF DESCRIPTION OF THE DRAWINGS

FIG. 7 is a schematic view of an MR fluid actuator unit using one or more of the MR fluid clutch apparatus of FIG.

1, one of the MR fluid clutch connected to a fixed part and one MR fluid clutch connected to the speed reducer;

DESCRIPTION OF THE PREFERRED EMBODIMENTS

Figure 1:
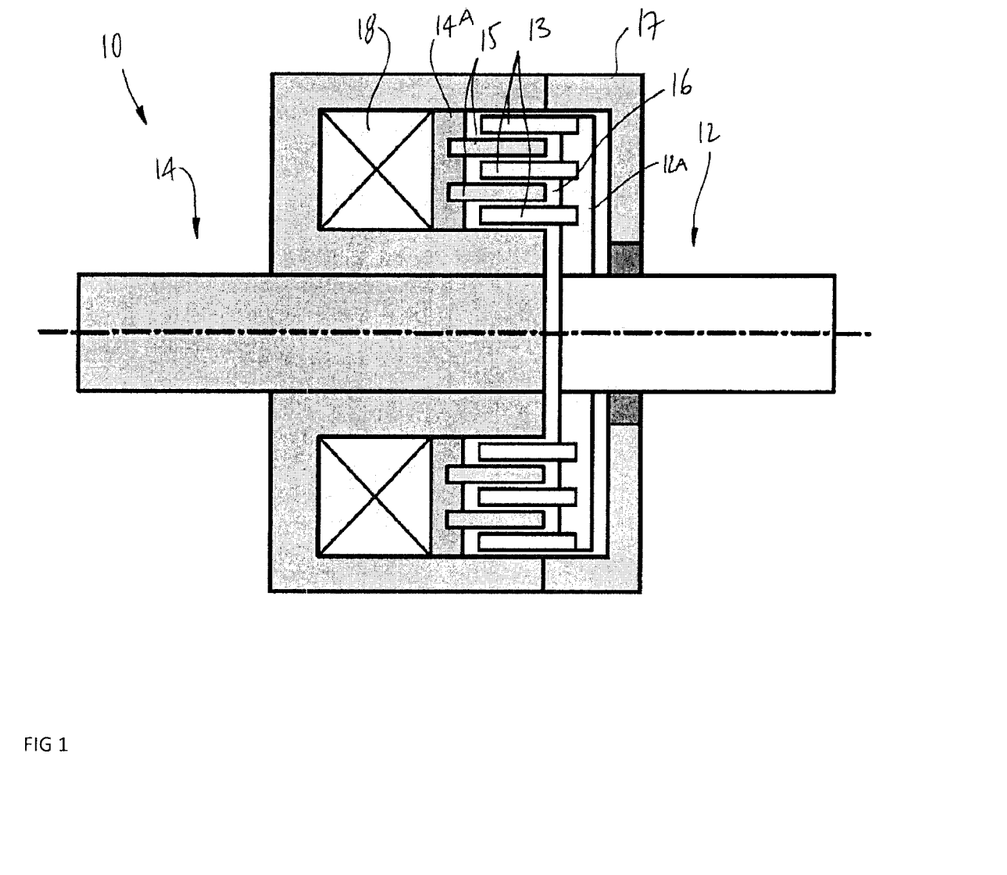
FIG. 1 is a schematic view of a MR fluid clutch apparatus used in systems of the present disclosure.

Referring to the drawings and more particularly to FIG. 1, there is illustrated a generic magnetorheological (MR) fluid clutch apparatus 10 configured to provide a mechanical output force based on a received input current. The MR fluid clutch apparatus 10 of FIG. 1 is a simplified representation of a MR fluid clutch apparatus that may be used in the systems described hereinafter. The MR fluid clutch apparatus that is used in the systems described hereinafter may have additional components and features, such as plates, redundant electromagnets, MR fluid expansion systems, etc.

The MR fluid clutch apparatus 10 has a driving member 12 with radial drums 13, this assembly also known as input rotor. The MR fluid clutch apparatus 10 also has a driven member 14 with drums 15 intertwined with the drums 13 to define one or more cylindrical chamber(s) filled with an MR fluid 16, the cylindrical chamber(s) being delimited by a casing 17 that is integral to the driven member 14. The assembly of the driven member 14 and drums 15 is also known as the output rotor. In the example of FIG. 1, the driving member 12 may be an input shaft in mechanical communication with a power input, and the driven member 14 may be in mechanical communication with a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the drums 13 on the drive side, and that of the drums 15 and of the walls of the casing 17 in the cylindrical chamber 17. The magnetic field intensity mainly affects the yield shear stress of the MR fluid. The yield shear stress of the fluid (a.k.a., the yield stress) when in its active ("on") state may be controlled by varying the magnetic field intensity produced by electromagnet 18 integrated in the casing 17, i.e., the input current, via the use of a controller. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 may be low enough to allow the driving member 12 to freely rotate relative to the driven member 14 and vice versa. When the torque supplied to the driving member 12 is inferior to the one the yield stress of the MR fluid 16 is able to produce, the speed of the output member 14 is the same as the input member 12 and the amount of power that the fluid has to dissipate may be reduced. In a shear situation, some torque is transmitted, but there is a relative speed between the input member 12 and the output member 14. The MR fluid allows slippage of the input member 12 relative to the output member 14, that may affect the properties of the MR fluid over time.

Figure 2A:
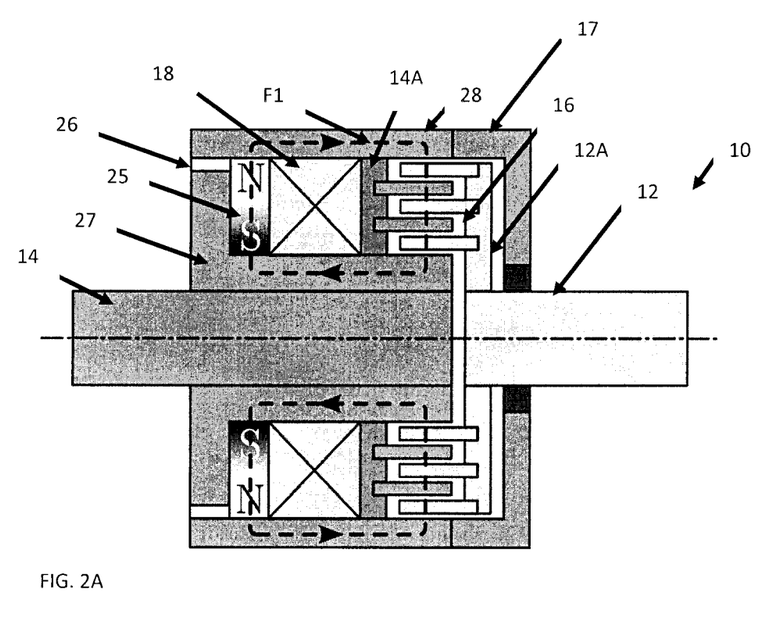
FIG. 2A is a partly sectioned view of the MR fluid clutch apparatus with a permanent magnet with a coil in an unpowered state, in accordance with the present disclosure.
Figure 2B:
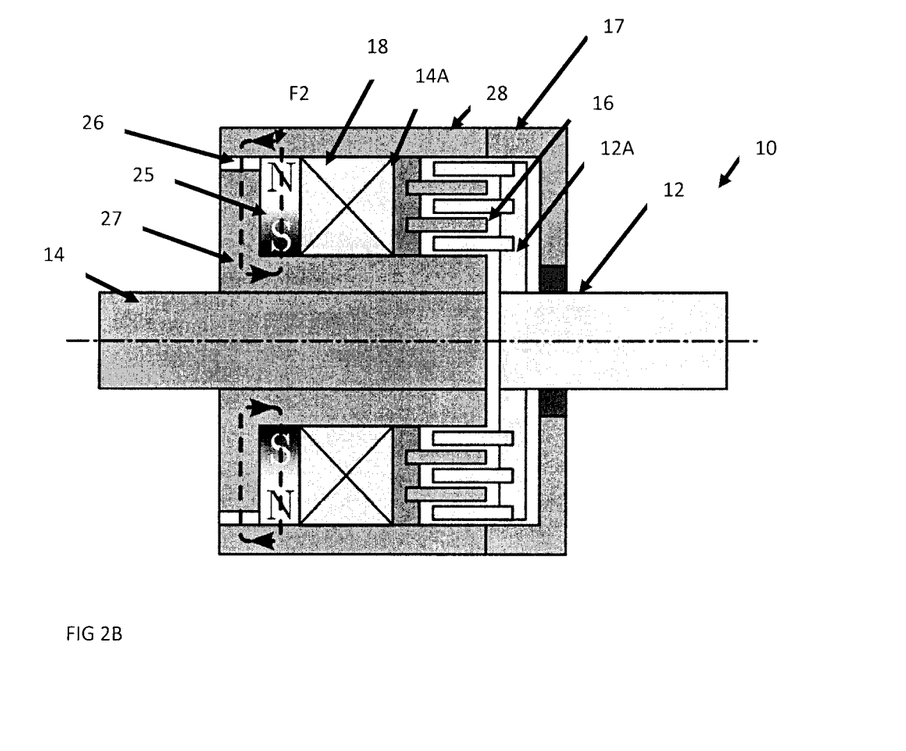
FIG. 2B is a partly sectioned view of the MR fluid clutch apparatus of FIG. 10, with the coil in a powered state.

Referring to FIGS. 2A-2B, the MR fluid clutch apparatus 10 is shown in yet another schematic embodiment. The MR fluid clutch apparatus 10 of FIGS. 2A and 2B has numerous similar components with the MR fluid clutch apparatus 10 of FIG. 1 whereby like elements will bear like numeral references, and their description is not duplicated unnecessarily herein. A distinction lies in the presence of a permanent magnet 25 connected to the outer annular wall 28 of casing 17, in addition to the coil 18.

As shown in FIG. 2A, the permanent magnet 25 is used to generate a magnetic field F1 in the MR fluid clutch apparatus 10 so that the apparatus 10 can transfer torque without the need to apply a current via the coil 18, in contrast to the MR fluid clutch apparatus 10 of FIG. 1 in which the reduction in slippage requires an increase in current powering the coil 18. The permanent magnet 25 is radially magnetized and may be a full solid annular part or an assembly of individual magnets (such as cylindrical magnets). Gap 26, also known as a redirection gap, separates the part of the outer annular wall 28 of casing 17, i.e., the outer magnetic core, from the inner magnetic core 27.

When no current is applied to the coil 18 (power-off), as in FIG. 2A, magnetic field F1 is present in the MR fluid according to the described magnetic flux path shown. Some magnetic flux circulates in the redirection gap 26. The width of the redirection gap 26 controls the amount of magnetic flux desired in the MR fluid, a.k.a. the desired power-off torque. If the redirection gap 26 is sufficiently wide, almost all the magnetic flux induced by the permanent magnet 25 goes through the MR fluid, leading to a high power-off torque. If the redirection gap 26 is radially narrower, the magnetic flux is shared between the MR fluid and the redirection gaps 26, leading to a lower power-off torque.

Figure 2C:
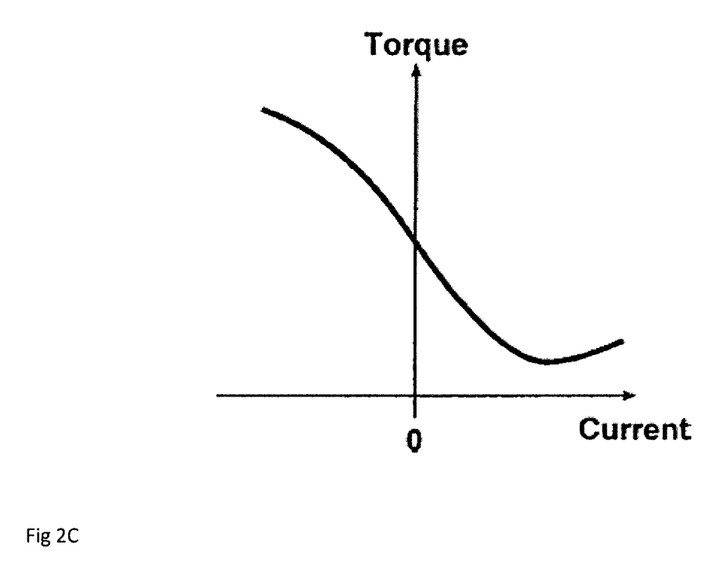
FIG. 2C is a schematic graph of torque as a function of current, for the MR fluid clutch apparatus of FIG. 2A.

As shown in FIG. 2B, when a current is applied in the coil 18 in order for the magnetic field generated to oppose to the indicated polarity of the permanent magnet 25, the magnetic flux induced by the permanent magnet 25 is redirected in the redirection gap 26 as shown by F2, which leads in a decrease of the magnetic flux in the MR fluid 16, hence a decrease of the torque transmittable by the MR fluid clutch apparatus 10 and consequently an increase in the slippage between the input member 12 and output member 14. At a given intensity of the coil current, the magnetic flux F1 in the MR fluid can nearly be cancelled or non-negligibly reduced and beyond this intensity, it will increase again (as seen in FIG. 2C). The width of the redirection radial gap 26 may also have an impact on the size of the winding of the coil 18. If the width is larger, a bigger winding is required to redirect the magnetic flux.

If the current is applied in the reverse direction, the coil 18 assists the permanent magnet 25 in the generation of magnetic flux in the MR fluid, leading to the increase of the transmittable torque of the MR clutch apparatus 10, again as shown in FIG. 2C.

Accordingly, the MR fluid clutch apparatus 10 has a normally "power-off" state of transmittable torque, because of the magnetic field induced by the permanent magnet 25. In this "power-off" state, also referred to as a lock mode, the slippage between the input member 12 and the output member 14 is below a given threshold, if not negligible or absent, for maximum rated torque transmission as long as the torque supplied on the input member 12 is below the torque transmittable by the MR fluid 16. The coil 18 is then powered to cause the MR fluid clutch apparatus 10 to vary the slippage and thus reduce torque transmission and eventually be in a controlled slippage mode. This arrangement is useful, for example when the MR fluid clutch apparatus 10 must maintain torque transmission in spite of a power outage. The magnetic field of the permanent magnet 25 would be of sufficient magnitude for the MR fluid clutch apparatus 10 to support a load without being powered. It bears mentioning that, although the lock mode is described with the use of a permanent magnet, it is contemplated to operate the lock mode with the MR fluid clutch apparatus 10 of FIG. 1 or equivalent, the coil 18 actuated to produce a magnetic field of sufficient magnitude to remove substantially or completely any slippage between the input member 12 and output member 14.

Although multimode systems may be composed of a single MR fluid clutch apparatus, there are benefits of having them working antagonistically with a biasing member or fully active and minimally composed of two MR fluid clutch apparatuses 10 getting their torque from a motor (such as an electric motor, hydraulic motor, or any other type of motor, geared or not), that operates at variable speed and thus at variable intensity. The multimode systems use different operational modes for the MR fluid clutch apparatuses 10. One of the modes is the "Controlled Slippage Mode" (CSA), obtained when the output torque of the system is controlled by varying the torque transmitted through MR fluid clutch apparatuses 10. For example, a multimode system may have two counter-rotating MR fluid clutch apparatuses 10. In such a case, the CSA mode has the output rotors 14 of the two MR fluid clutch apparatuses 10 turn at speed different than that of the input rotor 12 of the clutch apparatuses 10 so slippage occurs in both MR fluid clutch apparatuses. In the CSA mode, the output torque may be controlled by adjusting the torque transmitted by the MR clutch apparatuses 10, by controlling the current in the electromagnets 18 as explained above. The transmitted torque of a MR clutch apparatus 10 is adjusted by varying the yield stress of the MR fluid 16. The variation of the yield stress of the MR fluid 16 may be obtained by adjusting the magnetic field strength present in the MR fluid 16. The CSA mode combines the advantages of lightweight, high-speed electric geared motors, with the high dynamic performances enabled by the slippage of the MR fluid clutch apparatuses 10. When maintained in slippage, the MR fluid clutch apparatuses 10 decouple the dynamic behavior of motors from the outputs, resulting in low output inertia and high control quality since the high output inertia of the geared motors is not reflected at the system output. This may also result in increased force accuracy as the non-linear behaviors induced by the use of geared elements (e.g. cogging, gear backlash, friction) are filtered by the clutch apparatuses 10. This may also result in low mass and a reduced number of components since loads generated by the main geared motors can be shared between a plurality of outputs, and/or in some applications, high reliability as faulty geared motors can be disconnected from the output following clutch disengagement.

Another mode is the "lock mode", according to which the transmitted torque of at least one MR fluid clutch apparatus 10 corresponds to less than the yield stress of the MR fluid 16, the output of the system being controlled by varying the torque and speed generated by the motor A (shown in FIGS. 4 to 8). In lock mode, the input rotor 12 turns at substantially the same speed as that of the output rotor 14 in at least one MR fluid clutch apparatus 10. In a contemplated embodiment, a pair of the MR fluid clutch apparatus 10 is used in multimode. When high dynamic performances are required, the MR fluid clutch apparatus 10 may be used in CSA mode and when lower dynamic performances are required, the MR fluid clutches apparatus 10 may be used in lock mode. A typical application of this would be in a robot where most of the motion may be controlled in lock mode of one MR fluid clutch apparatus 10, switching to CSA mode only for limited or short periods of time when providing fine movement with high bandwidth controllability (i.e.: contact with a human or objects, haptic teaching to the robot, smoothing the acceleration or the deceleration, rapid directional changes). By using the MR fluid clutch apparatus 10 in multimode, the amount of energy dissipated in the fluid may be reduced in comparison to non-multimode arrangements, hence lessening exposure of the fluid to property change conditions over time.

Figure 3:
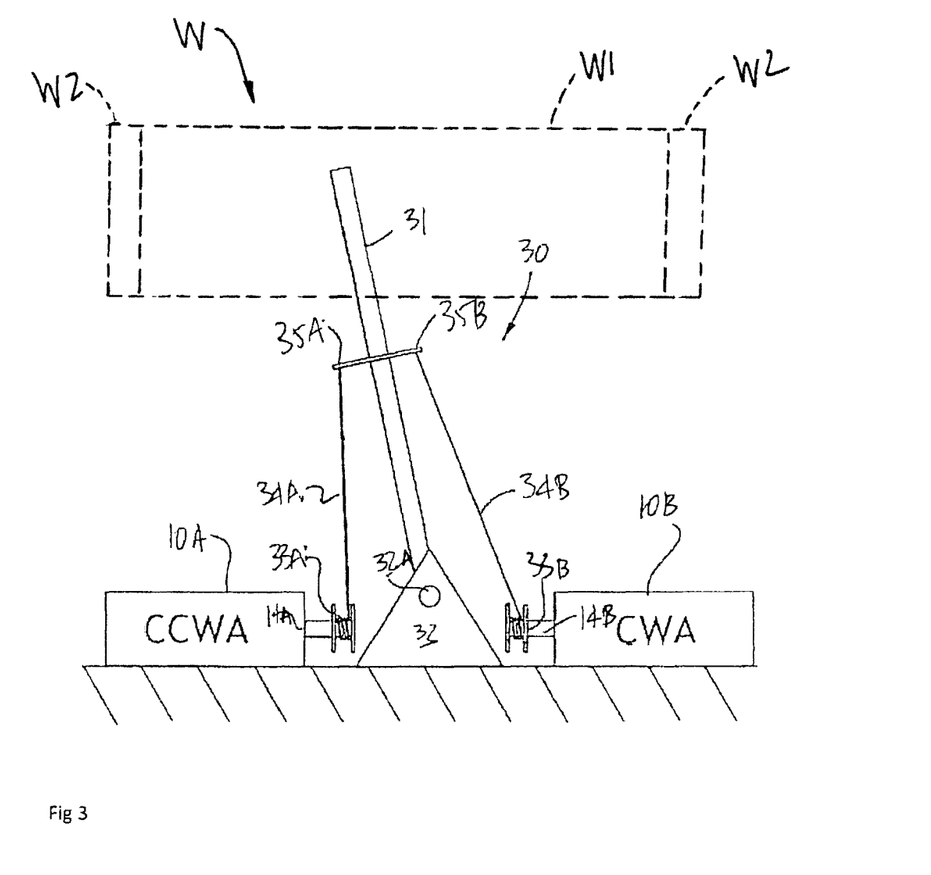
FIG. 3 is a schematic view of a cable-driven system using a common power source with a pair of MR fluid clutch apparatuses for antagonistic displacement of an end effector.

Referring to FIG. 3, a cable-driven system in accordance with the present disclosure is generally shown at 30, to control the reciprocating motion of an end effector 31. The end effector 31 is illustrated as being a pivoting arm, mounted to a base 32 by pivot 32A. Accordingly, the end effector 31 is movable in one rotational degree of freedom (DOF). Although the end effector 31 is shown as being movable in one rotational DOF, the end effector 31 could be connected to the base 32 by a translation joint, whereby the system 30 would provide a translational DOF. The cable-driven system 30 may have n MR fluid clutch apparatuses 10 receiving a torque input from a single power source (not shown) via a common power shaft (not shown) driven by the power source. For example, the power source may be an electric motor, although other types of power sources may be used, such as hydraulic motors to name one among numerous other examples.

The MR fluid clutch apparatuses 10 are each equipped with an output member 33 upon which is mounted a cable 34, to form a tensioning set, illustrated as 33A and 34A when coupled to the MR fluid clutch apparatuses 10A, and illustrated as 33B and 34B when coupled to the MR fluid clutch apparatuses 10B (this nomenclature used elsewhere for system 30). The output member may practically be connected to the driven member 14 (FIG. 1) of the MR fluid clutch apparatuses 10 so as to rotate therewith. However, the output member may also have mechanisms between the driven member 14 and the output member 33 instead of being a direct drive. For example, the output member 33 may incorporate a reduction gearbox. The expression "output wheel" is used as an encompassing expression for equivalent parts, such as a pulley, a chainring, a sprocket, a nut, a screw, lever arm, etc. Likewise, the expression "cable" is used as an encompassing expression for equivalent parts, such as a tendon, rope, belt, chain, and like tensioning members. The selection of the type of cable is based on the type of output wheel. The cable 34 has an end attached to the output wheel 33, a free end 35 attached to an output component, with a length of the cable being wound about the output wheel 33. A rotation of the output wheel 33, for instance as driven by the driven member 14 (FIG. 1), may wind additional cable length onto the output wheel 33, resulting in a pulling action at the free end of the cable 34. A pulling action on the free end 35 may alternatively result in an unwinding of the cable 34 from the output wheel 33, for instance when the MR fluid clutch apparatus 10 is in a slippage condition, i.e., when the pulling action on the free end 35 exceeds the force produced by the driven member 14. The cable-driven system 30 has a pair of the MR fluid clutch apparatuses 10 (although n MR fluid clutch apparatuses 10 could be present), one of which is shown at 10A and the other of which is shown as 10B, the apparatuses 10A and 10B being connected to a common power source A (not shown) The MR fluid clutch apparatuses 10A and 10B are connected via cables 34 to the common end effector 31. In spite of being driven directly by the common power source, the MR fluid clutch apparatuses 10A and 10B provide antagonistic pulling actions on the common end effector 31, to enable reciprocating movement. It is also considered to provide a single MR fluid clutch apparatus 10 and thus a single cable 34 connected to the end effector 31, with an antagonistic force provided by a biasing member such as a linkage, spring, gravity, other type of actuators, etc (not shown). The biasing member may also include more complex mechanisms, such as a servo system, linear actuators, etc. In other words, any mechanism capable of opposing an antagonistic force to the end effector 31 may be used. The source of power of the biasing member may also come from a human. This is applicable for given embodiments provided below as well.

In typical antagonistic actuation systems, one actuator per degree-of-freedom (DOF) is generally used. Each actuator must therefore be designed to satisfy the maximum load for the degree-of-freedom it is driving. The DOF is actuated by two actuators because of the cables' inability to transmit compressive loads. Each DOF is hence actuated by two antagonistic actuators and generally only one is being activated at a time because of their opposing effect. For example, if a load is required to be produced in the clockwise direction, a clockwise actuator (CWA) is powered and the counter-clockwise actuator (CCWA) is unpowered and vice-versa if the load is required to be produced in the other direction.

In contrast, when centralizing the power source in the system 30 of FIG. 3, the resulting system may lead to a compact and lightweight design. Moreover, since the controlled-slippage MR fluid clutch apparatuses 10 may uncouple the inertia of the power source from the end effector 31, a lightweight power source, such as a high-speed electric motor coupled with a high-ratio reduction gearbox can be used without impacting the system's dynamic performance. Furthermore, the required load for the power source A can be tailored according to the application, leading to further weight reduction. For example, as the system 30 utilizes a purely antagonistic actuation arrangement, the power source is not required to produce the sum of the load capacity of both MR fluid clutch apparatuses 10 it is driving, since only one of the pair can be active at the same time. The power source A can therefore be designed for only approximately one half of the total load requirement (i.e., the "offstate or free state" power of the clutch apparatus in slippage being greater than zero).

When used in CSA mode and used with a geared motor as power source, the MR fluid clutch apparatuses 10 in the cable-driven system 30 decouples the dynamic behavior of the motor from the outputs resulting in a low output inertia and high control quality since the high output inertia of the geared motor is not reflected at the system output. The cable-driven system 30 may also provide an increased force accuracy as the non-linear behaviors of the geared motor (e.g. cogging, gear backlash, friction) are filtered by the MR fluid clutch apparatuses 10. The cable-driven system 30 also has a relatively low mass and a reduced number of components since loads generated by a common geared motor can be shared between a plurality of outputs. In some applications, the cable-driven system 30 may be reliable as a faulty geared motor can be disconnected from the output following clutch disengagement, when a redundant motor is available as back-up.

The cable-driven system 30 may be used in lock mode as well. When used in lock mode, only one of an antagonistic pair of the MR fluid clutch apparatuses 10 may be locked at a time, otherwise an opposing force would result on the end effector 31. When one MR fluid clutch apparatus 10 is locked, the locked MR fluid clutch apparatus 10 couples the cable-driven system 30 to the dynamic behavior of the motor resulting in a high output inertia and low control quality since the geared motor is reflected at the end effector 31. The locked MR fluid clutch apparatus 10 does not shear the MR fluid 16 (there is little or no slippage), which results in less energy dissipation in the MR fluid 16, with a view to limit the exposure of the MR fluid clutch apparatus 10 to property change conditions. In an antagonist system such as 30, the motor is often configured to turn in a single direction. This is due to the inability of the cable to transmit a compressive load. In lock mode, the cable system 30 may operate such that one MR fluid clutch apparatus (e.g., 10A) is locked while the other one (e.g., 10B) is unlocked, the motor being controlled to provide torque to the pulley 33A of the locked MR fluid clutch apparatus 10A, such that the end effector 31 is pulled by the cable 34A of the locked MR fluid clutch apparatus 10A. During the movement, the unlocked MR fluid clutch apparatus 10B will allow slippage to happen between its output 14B and its input, hence resulting in cable 34B unwinding from its pulley 33B. When a direction change is desired at the end effector 31, the motor may slow down to reach a stop condition and then the MR fluid clutch apparatus 10A may go in unlock mode (i.e., CSA mode) while the MR fluid clutch apparatus 10B may go in lock mode. When the motor turns again, the MR fluid clutch apparatus 10B will pull on cable 34B while the cable 34A connected to the unlocked MR fluid clutch apparatus 10A unwinds from the pulley 33A, and vice versa. According to an embodiment, the system 30 has a working envelope illustrated schematically as W. The working envelope W is illustrated as rectangular to facilitate understanding and as applicable to robots or systems having more than one rotational degree of freedom of movement. The working envelope W may have a low controllability portion W1 and high controllability portions W2. In portion W1, the system 30 may be in lock mode by default as the end effector 31 is not close to its movement boundaries. On the other hand, in portions W2, the system 30 may be switched to CSA mode automatically, as the end effector 31 nears its movement boundaries and may therefore come into contact with its environment, for example, or must perform a task with an adjacent device or apparatus. It is observed that the low controllability portion W1 occupies a substantial portion of the working envelope W, for example, between 85% to 98% of the working envelope W, while the high controllability portions W2 define a remainder of the working envelope W. Accordingly, throughout a substantial portion of the displacements of the end effector 31, the system 30 operates in lock mode, so as to reduce the operation in CSA mode. This being said, the system 30 may override the default settings, and switch to CSA mode in the low controllability portion W1. This may occur for example when a change of direction of the end effector 31 is required in the low controllability portion W1. This may also occur when a sensor detects a condition in which the end effector 31 must decelerate or come to a stop. The condition may be that of a manual intervention on the end effector 31 in the low controllability portion W1.

Figure 4:
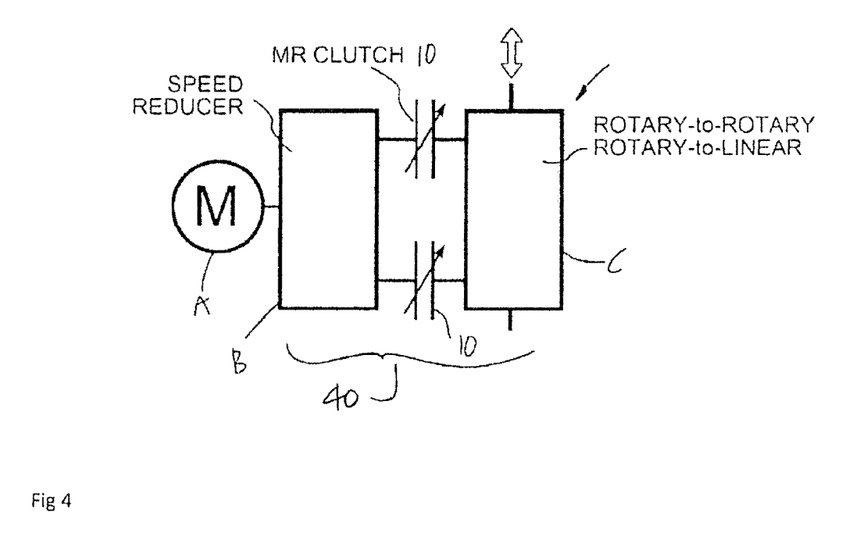
FIG. 4 is a schematic view of an MR fluid actuator unit using one or more of the MR fluid clutch apparatus of FIG. 1, both MR fluid actuators connected to the speed reducer and turning in opposite direction.

Referring to FIG. 4, a MR fluid actuator unit 40 is generally shown as being constituted of a power source A (e.g., a motor), a speed reducer B, at least one of the MR fluid clutch apparatuses 10 and an output device C or mechanism. The output device C may be a rotary-to-rotary device, or a rotary-to-linear device. In FIG. 4, the MR fluid actuator unit 40 has two MR fluid clutch apparatuses 10 turning in opposite directions. The MR fluid actuator unit 40 may operate both in the lock mode and the CSA mode.

Figure 5:
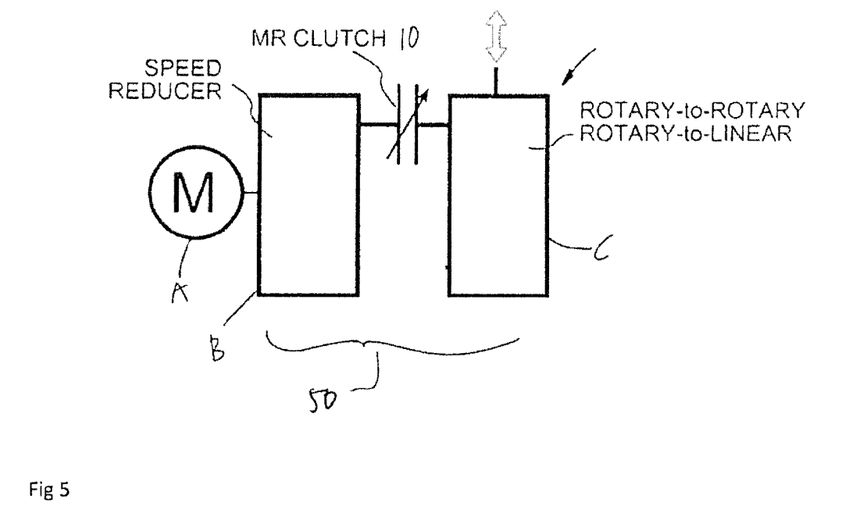
FIG. 5 is a schematic view of an MR fluid actuator unit using one of the MR fluid clutch apparatus of FIG. 1, the MR fluid actuator used to decouple the motor and speed reducer from the Rotary-to-Rotary or Rotary-to-Linear converter.

Referring to FIG. 5, the MR fluid actuator unit 50 shown is similar to MR fluid actuator unit 40 of FIG. 4 with the difference that it is constituted of a single MR fluid clutch apparatus 10. In this configuration, the viscous torque may be transmitted to the rotary-to-rotary device or a rotary-to-linear device in a single direction, slightly reducing the controllability of the system but decreasing the number of components required. The MR fluid actuator unit 50 may operate both in the lock mode and the CSA mode. To change the direction of the viscous torque transmitted to the rotary-to-rotary device or a rotary-to-linear device, the differential speed between driving member 12 and the driven member 14 must be reversed by either a change of the motor direction or a back-driving torque coming from the rotary-to-rotary device or a rotary-to-linear device.

Figure 6:
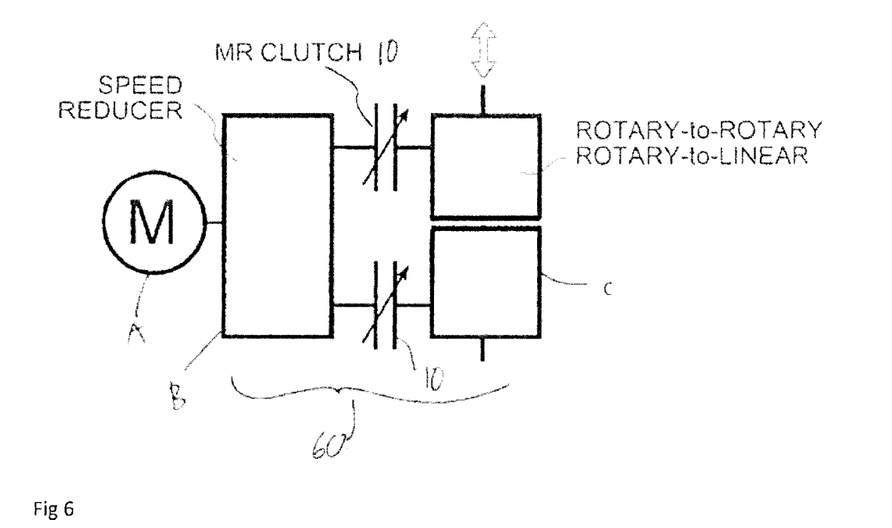
FIG. 6 is a schematic view of an MR fluid actuator unit using one or more of the MR fluid clutch apparatus of FIG. 1, all MR fluid actuators connected to the same speed reducer and actuating different Rotary-to-Rotary or Rotary-to-Linear converters.

Referring to FIG. 6, the MR fluid actuator unit 60 shown is similar to the MR fluid actuator unit 40 of FIG. 4, with the difference that two or more MR fluid clutch apparatuses 10 are connected to individual rotary-to-rotary device C, or a rotary-to-linear device. This arrangement may be useful to control antagonist systems as in FIG. 3 where one of the rotary-to-rotary or rotary-to-linear converter is connected to a device that can only transmit force in tension (i.e. cable) or compression (i.e. hydraulic system). The MR fluid actuator unit 60 may operate both in the lock mode and the CSA mode.

Figure 7:
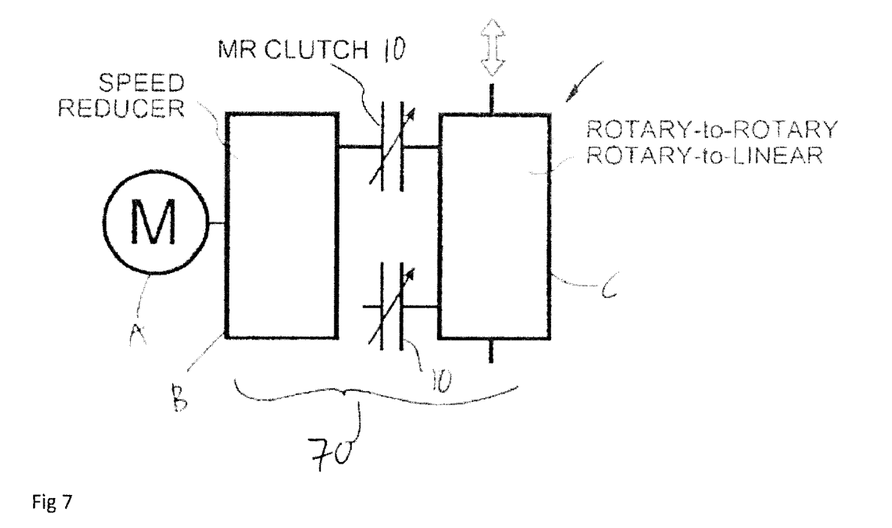

Referring to FIG. 7, an alternative construction of MR fluid actuator unit is shown at 70 where a single MR fluid clutch apparatus 10 is connected to the speed reducer and where a second MR fluid clutch apparatus 10 is connected to another component (not shown). This construction may be useful for the second clutch to reduce the effect on the output of the viscous torque generated by the first MR fluid clutch apparatus 10 that is connected to the speed reducer, increasing the controllability of the system. The MR fluid actuator unit 70 may operate both in the lock mode and the CSA mode.

Figure 8:
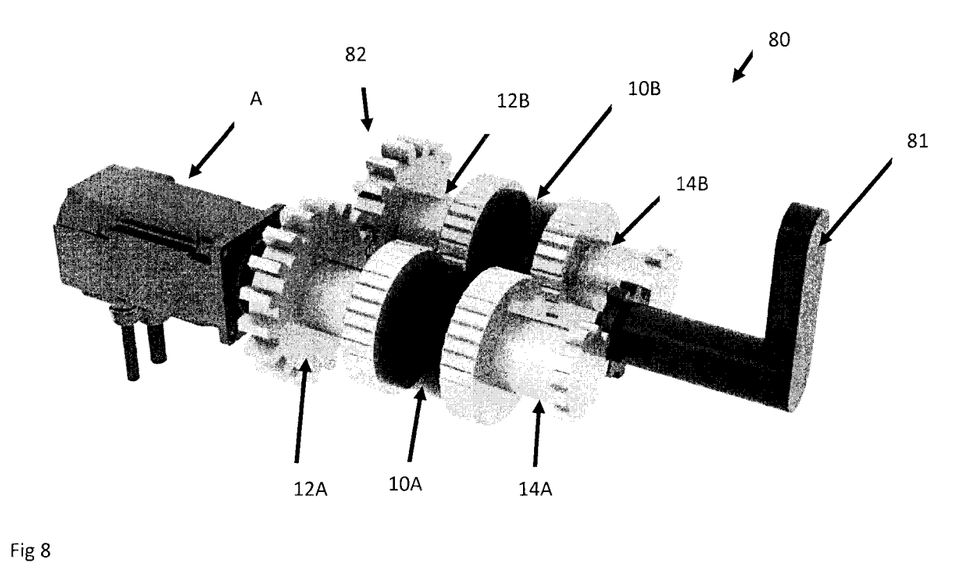
FIG. 8 is an illustration of a multimode controlled antagonist MR fluid clutch apparatus.

Referring to FIG. 8, a typical MR fluid actuator unit 80 is shown with a rigid output link 81. The output member 81 of the MR fluid actuator unit 80 may transmit loads in two directions. In the MR fluid actuator unit 80, the clutch apparatus 10A turns in the same direction as the motor A while the clutch apparatus 10B, using the rotation reversal system 82, turns in the opposite direction. When operated in lock mode, the motor A may control the position and the movement of the output link 81 by transmitting torque using only one MR fluid clutch apparatus 10. The other clutch apparatus 10 may not transmit torque to the output. In this operation mode, in order to make a more efficient system, one of the MR fluid clutch apparatuses 10 may stay in lock mode by the use of a permanent magnet as described in FIG. 2 and the other MR fluid clutch apparatus 10 may stay in CSA mode may be of the type of FIG. 1. In the MR fluid actuator unit 80, the direction of the output link 81 may be controlled by the direction of rotation of the motor A or the MR fluid clutch apparatus 10 that is in lock mode. For example, in order to have the output turn in the clockwise (CW) direction, the motor A may turn CW and the MR fluid clutch apparatus 10A, turning in the same direction, may be used in lock mode, while the MR fluid clutch apparatus 10B turning in the other direction (CCW) may be used in open mode (i.e., CSA mode). Alternatively, the motor A may turn CCW and the MR fluid clutch apparatus 10A turning CCW may be used in open mode (i.e., CSA mode), while the MR fluid clutch apparatus 10B turning in the opposite direction (CW) may be used in lock mode. When operated in CSA mode, the output link 81 may move in opposite directions by controlling the slippage in both MR fluid clutch apparatuses 10. Control may be obtained similarly to the system 30 of FIG. 3 with the difference that the CSA may be obtained with the motor A turning either CW or CCW. The benefit of working in lock mode may be lower dissipated energy in the MR fluid 16 while decreasing the dynamics performance of the actuator unit 80. The benefit of working in CSA mode is a better dynamic performance of the actuator unit 80. The combination of both modes lessens the exposure of the MR fluid clutch apparatuses 10 to property changing conditions, in comparison to operation in CSA mode only.

Figure 9:
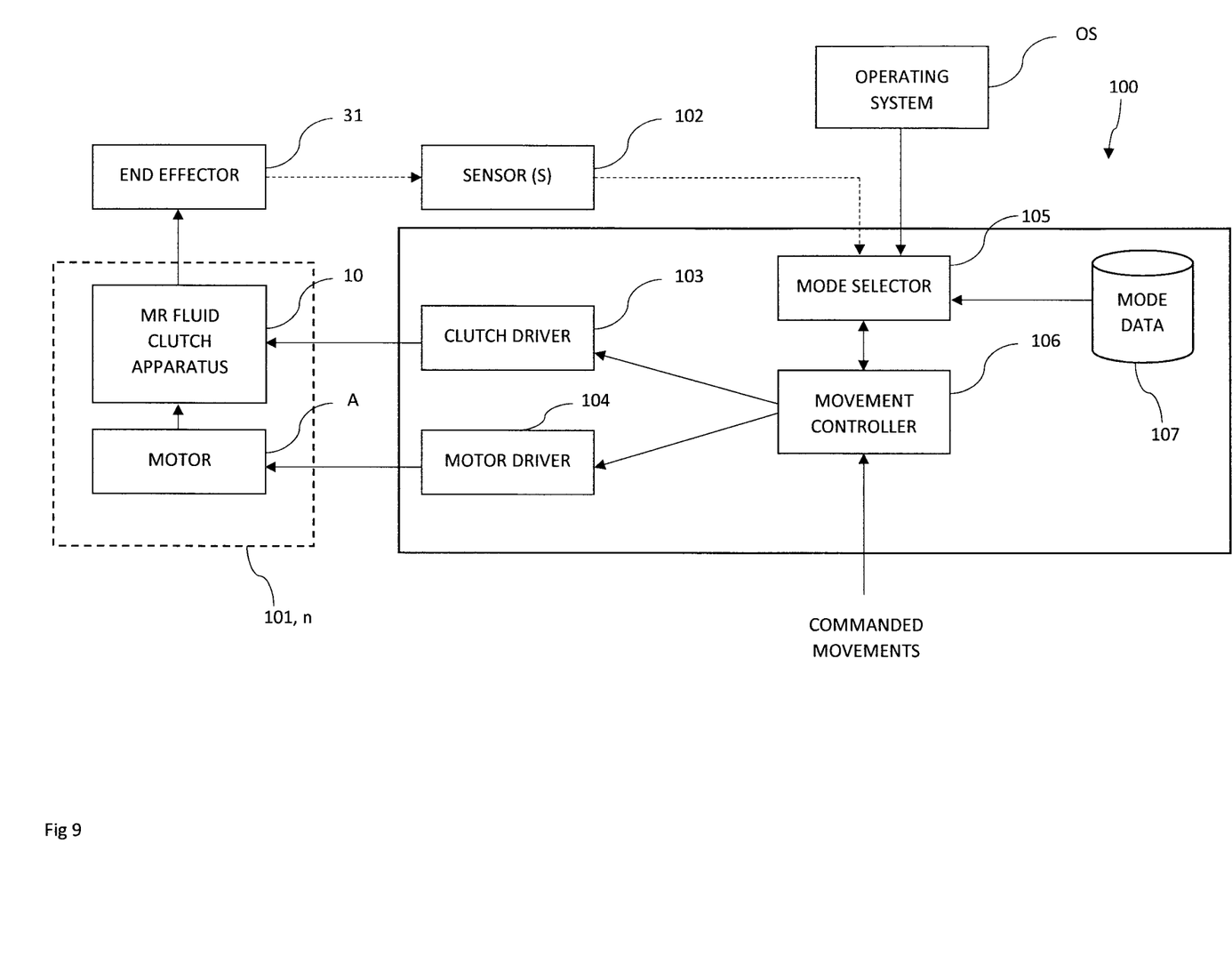
FIG. 9 is a block diagram of a control system used in an embodiment to control the MR fluid clutch apparatuses of the present disclosure.

Referring to FIG. 9, there is illustrated a schematic of a control system 100 that may be used in conjunction with the various MR fluid actuator units to control the MR fluid actuator and determine which mode, CSA mode or lock mode, the system may be used in. In FIG. 9, the control system 100 is of the type used with one or more MR fluid actuator units 101, n (n=1, 2, 3, +), which may be any of the MR fluid actuator unit described above. For simplicity, the MR fluid actuator unit 101 is shown with a single MR fluid clutch apparatus 10 and motor A, although any combination is possible. This includes the use of the control system 100 with one or more of the MR fluid actuator units of FIGS. 4 to 7, or any combination thereof, in addition to the use of the control system 100 with the arrangements of FIGS. 3 and 8. Moreover, the MR fluid actuator unit 101 is shown as being connected to an end effector 31, which may be of any appropriate kind as described above. The control system 100 may use information coming from a sensor 102 or multiple sensors in order to determine if the system should be used in CSA mode or lock mode. The command to determine if the system should be used in CSA mode or lock mode may also come from a user interface (not shown) or other source. The signals produced by the sensors 102 may be representative of one or more movement parameters of the end effector 31. For example, the movement parameters may be one or more of an external force or pressure on the end effector 31, a distance travelled, proximity to a boundary or to an object, etc. The boundary may be programmed as a virtual working range of a robot, and may rely on many various types of sensors (e.g., proximity switch, optical sensor, etc)

Therefore, the control system 100 has a clutch driver 103 configured to drive the MR fluid clutch apparatus(es) 10 between the controlled slippage mode and the lock mode. As detailed above, in the controlled slippage mode, slippage between the clutch input 12 and the clutch output 14 (FIG. 1) of the MR fluid clutch apparatus 10 varies and thus the torque transmitted to the end effector 31 varies as well. In the lock mode, the slippage between the clutch input 12 and the clutch output 14 (FIG. 1) is below a given threshold, if not negligible or absent. The clutch driver 103 controls the current sent to the electromagnet coil (e.g., 18 in FIG. 1, or FIGS. 2A and 2B) as a function of the specifications of the MR fluid clutch apparatus 10, for example the size of the gap 26, the magnetic force of the permanent magnet 25, etc., as a function of parameters of movement of the end effector 31 that may be monitored by the sensor 102, as provided by a movement controller 106. A motor driver 104 may be configured to vary an intensity of a motor output (whether in terms of velocity or torque) of the motor A, if the motor A is not configured to operate at constant velocity or constant torque, for example (i.e., no variation). A mode selector module 105 may be configured to receive the signals from sensor(s) 102 representative of the movement parameter(s) (including force or pressure) of the end effector 31, or of other parts of the MR fluid actuator unit 101 or mechanism, such as the motor A (e.g., stress sensor, hydraulic pressure sensor, force sensor) or the fluid clutch apparatus 10. The mode selector module 105 selects a mode between the controlled slippage mode and the lock mode of the clutch driver 103 based on the signals, and switches the selected mode based on the signals. The mode selector module 105 may have a database 107 in which mode selection is programmed, as a function of the monitored signals. Just by way of example, if an external pressure beyond a given value is sensed at the end effector 31, the mode selection program may require that the control system 100 automatically go in the controlled slippage mode. Based on the selection of mode, the movement controller 106 controls the clutch driver 103 and the motor driver 104 to displace the end effector 31 based on the selected mode and on commanded movements of the end effector 31. In terms of commanded movements, the end effector 31 may be part of a robot or automated system performing given tasks (such as operating system OS), in which case the control system 100 may be commanded, controlled or programmed to execute specific movements. The movement controller 106 determines the intensity (e.g., speed or torque) of the motor output in the locked mode if not at constant torque or constant speed, with the MR fluid clutch apparatus 10 providing limited or negligible slippage. The movement controller 106 also determines the parameters of movements of the end effector 31 (e.g., distance to move, acceleration, deceleration, stop, release) for the MR fluid clutch apparatus 10 to adapt the controlled slippage mode such that the end effector 31 may achieve the commanded movements. According to an embodiment, the movement controller 106 receives the commanded movements from a user, a program, an external system, and forwards the commanded movements to the mode selector module 105 such that the mode selector module 105 selects the mode based on movements constraints of the end effector 31 (e.g., working envelope).

The control system 100 may therefore control independently the motor driver 104 that may command motor torque or speed, and the clutch driver 103 that may control the amount of torque that the MR fluid clutch apparatuses 10 may transfer in CSA mode or lock mode. A good example of this may be a robot arm using a MR fluid actuator unit of the types that are proposed above. The MR fluid actuator units may work in lock mode most of the time (e.g., between 75% and 98% of the time of movement of the end effector 31) in order to reduce the exposure of the MR fluid to property variation conditions. The lock mode operation may be in the low controllability portion of the working envelope as in FIG. 3, for a substantial portion of the movement (e.g., between 85%-98%). In the lock mode, the speed and force of the robot arm may be proportional to the speed and the force generated by the motor. The MR fluid actuator units may be actuated in CSA mode in numerous circumstances, such as when the end effector is in the high controllability portion of the working envelope, or when the end effector must come to a stop, deceleration and/or change of direction. As another possibility, when a force sensor 102 senses that the robot arm or end effector is contacting an obstacle (i.e. human or material) or a safety brake condition has been detected, the control system 100 may be programmed to perform a rapid stop of arm movement and consequently switch the operation in CSA mode or even full slippage in order to improve the dynamic performance of the robot arm. Because the dynamic performance of the actuator unit is improved in CSA mode, the robot arm may be stopped faster than in lock mode. The faster action may be obtained by allowing slippage in the MR fluid clutch apparatus 10. The movement controller 106 determines the parameters of operation to drive the MR fluid clutch apparatus 10. If a counter-rotating MR fluid clutch apparatus 10 is present, it may provide a reversing force on the robot arm. This action does not require to stop the motor so it may happen faster than a normal servo motor with a gearbox transmitting its full torque via a MR fluid actuator unit operating in lock mode.

The control system 100 may be operated according to a method in which it is continuously (e.g., regularly or periodically) sensing at least one movement parameter of the end effector. The control system 100 may repeatedly switch between modes, whereby the continuous sensing provides the information for dynamic operation. The mode of operation of the MR fluid clutch apparatus(es) 10 is selected based on sensed movement parameter(s) and a commanded movement. A motor output of motor A coupled to the MR fluid clutch apparatus may be varied or kept constant (e.g., constant speed, constant torque) in a first selected mode (lock mode), while a slippage of the MR fluid clutch apparatus is kept below a given threshold (negligible) to cause a displacement of the end effector 31 in a commanded movement. In a second selected mode (CSA mode), the slippage of the MR fluid clutch apparatus 10 is varied beyond the given threshold to continue a displacement of the end effector 31 in the commanded movement, but with adjustable slippage.

There may be numerous sensors 102 used in complementary fashion to detect different parameters. As yet another possibility, the sensors 102 include accelerometers or speed sensors, and the mode selector 105 is configured to switch to CSA mode when the acceleration of the end effector 31 is beyond a given acceleration or velocity/speed threshold. A user of the control system 100 may also command the control system 100 to override the automatic mode selection to perform haptic teaching in CSA mode, in which the end effector 31 is manipulated by a user while the movements of the end effector 31 are recorded to be replicated subsequently by automation. In haptic teaching in CSA mode, the end effector 31 or like robot arm needs to be displaceable with low impedance in order to be easily manipulated by the user. The control system 100 may therefore communicate with an operating system OS associated to the end effector 31, operating system OS giving commands such as movement parameters, desired modes of operation, safety conditions, etc.

Therefore, when the end effector 31 or like robot arm performs tasks requiring force control as opposed to position control, the control system 100 may select the CSA mode. Such tasks may vary depending on the use of the end effector 31, and may include as non-exhaustive examples the manipulating of fragile objects, the actuation of a device that needs force control, such as a surface polisher, a wiping device, pressing parts together. Robots featuring the control system 100 may benefit from the use of CSA mode for instance in directional changes, as the change of direction may be done without having to change the direction of the motor, such that cheaper motors may be used instead of expensive servo motor. By way of the control system 100, a robot may perform rapid directional changes that are beyond the bandwidth of servo motors. As a result, the end effector 31 may offer faster adjustments and more precise manipulations in the CSA mode, yet with the lock mode reducing the operation of the MR fluid clutch apparatuses 10 in slippage.

The invention claimed is:

1. A control system for controlling movements of an end effector connected to a clutch output of at least one magnetorheological (MR) fluid clutch apparatus, the control system comprising:
   a clutch driver configured to drive the at least one MR fluid clutch apparatus between a controlled slippage mode, in which slippage between a clutch input and the clutch output of the MR fluid clutch apparatus varies, and a lock mode, in which said slippage between the clutch input and the clutch output is maintained below a given threshold, the clutch output transmitting movement to the end effector;
   a motor driver configured to control a motor output of at least one motor, the motor output coupled to the clutch input;
   a mode selector module configured to receive signals representative of at least one movement parameter of the end effector, the mode selector module selecting a mode between the controlled slippage mode and the lock mode of the clutch driver based on the signals, and switching the selected mode based on the signals; and
   a movement controller to control the clutch driver and the motor driver to displace the end effector based on at least one of the selected mode and on commanded movements of the end effector for the end effector to achieve the commanded movements.

2. The control system according to claim 1, wherein the mode selector module receives data on the commanded movements and selects the mode according to the commanded movements and on the at least one movement parameter.

3. The control system according to claim 1, wherein the clutch driver supplies current to the at least one MR fluid clutch apparatus to reduce the slippage.

4. The control system according to claim 1, wherein the clutch driver supplies current to the at least one MR fluid clutch apparatus to increase the slippage.

5. The control system according to claim 1, wherein the motor driver is configured to a vary an intensity of a motor output of the at least one motor, and wherein the movement controller determining the intensity of the motor output in the locked mode.

6. The control system according to claim 1, wherein the mode selector module receives signals indicative of a manual contact with the end effector, and selects the controlled slippage mode throughout the manual contact.

7. The control system according to claim 1, wherein the mode selector module receives signals indicative of a position of the end effector in a working envelope thereof, and selects the mode based on the position.

8. The control system according to claim 7, wherein the mode selector module determines that the position of the end effector is in a high controllability portion of the working envelope and selects the controlled slippage mode for the high controllability portion.

9. The control system according to claim 7, wherein the mode selector module determines that the position of the end effector is in a low controllability portion of the working envelope and selects the lock mode for the low controllability portion.

10. The control system according to claim 1, wherein the mode selector module receives signals indicative of at least one of a speed and acceleration of the end effector, the mode selector module selecting the controlled slippage mode when the speed and/or acceleration is beyond a programmed threshold.

11. The control system according to claim 1, wherein the mode selector module determines from the commanded movements a change of direction of the end effector, the mode selector module selecting the controlled slippage mode for the change of direction of the end effector.

12. The control system according to claim 1, wherein the mode selector module selects and maintains the lock mode for 75%-98% of an operation of the end effector.

13. An assembly of a control system and MR fluid actuator unit controlling movements of an end effector, the assembly comprising:
   the control system according to claim 1,
   at least one MR fluid actuator unit including at least one MR fluid clutch apparatus and at least one motor, each of the at least one MR fluid clutch apparatus having a clutch output transmitting movement to the end effector, and having a clutch input coupled to an output of at least one motor.

14. The assembly according to claim 13, wherein the at least one MR fluid actuator unit has two of the MR fluid clutch apparatus for a single one of the motor.

15. A method for controlling movements of an end effector connected to at least one magnetorheological (MR) fluid clutch apparatus, the method comprising:
   continuously sensing at least one movement parameter of the end effector;
   selecting a mode of operation of the MR fluid clutch apparatus based on at least one movement parameter and a commanded movement;
   driving a motor output of at least one motor coupled to the MR fluid clutch apparatus, while keeping a slippage of the MR fluid clutch apparatus below a given threshold to cause a displacement of the end effector in a commanded movement in a lock mode; and
   varying the slippage of the MR fluid clutch apparatus beyond the given threshold to continue a displacement of the end effector in the commanded movement in a controlled slippage mode.

16. The method according to claim 15, wherein driving the motor output in the lock mode comprises maintaining an intensity of the motor output fixed.

17. The method according to claim 15, wherein varying the slippage of the MR fluid clutch apparatus includes supplying current to the at least one MR fluid clutch apparatus to reduce the slippage.

18. The method according to claim 15, wherein varying the slippage of the MR fluid clutch apparatus includes supplying current to the at least one MR fluid clutch apparatus to increase the slippage.

19. The method according to claim 15, wherein driving the motor output in the lock mode comprises varying an intensity of the motor output based on at least one movement parameter and a commanded movement.

20. The method according to claim 15, wherein continuously sensing includes sensing a manual contact with the end effector, and wherein selecting the mode of operation includes selecting the controlled slippage mode throughout the manual contact.

* * * * *